Feb. 23, 1954          G. E. STILWELL          2,669,715
MACHINE FOR MAKING HEXAGONAL BOXES
Filed July 27, 1949          5 Sheets-Sheet 1

GLENN E. STILWELL
INVENTOR.
BY
ATTORNEY

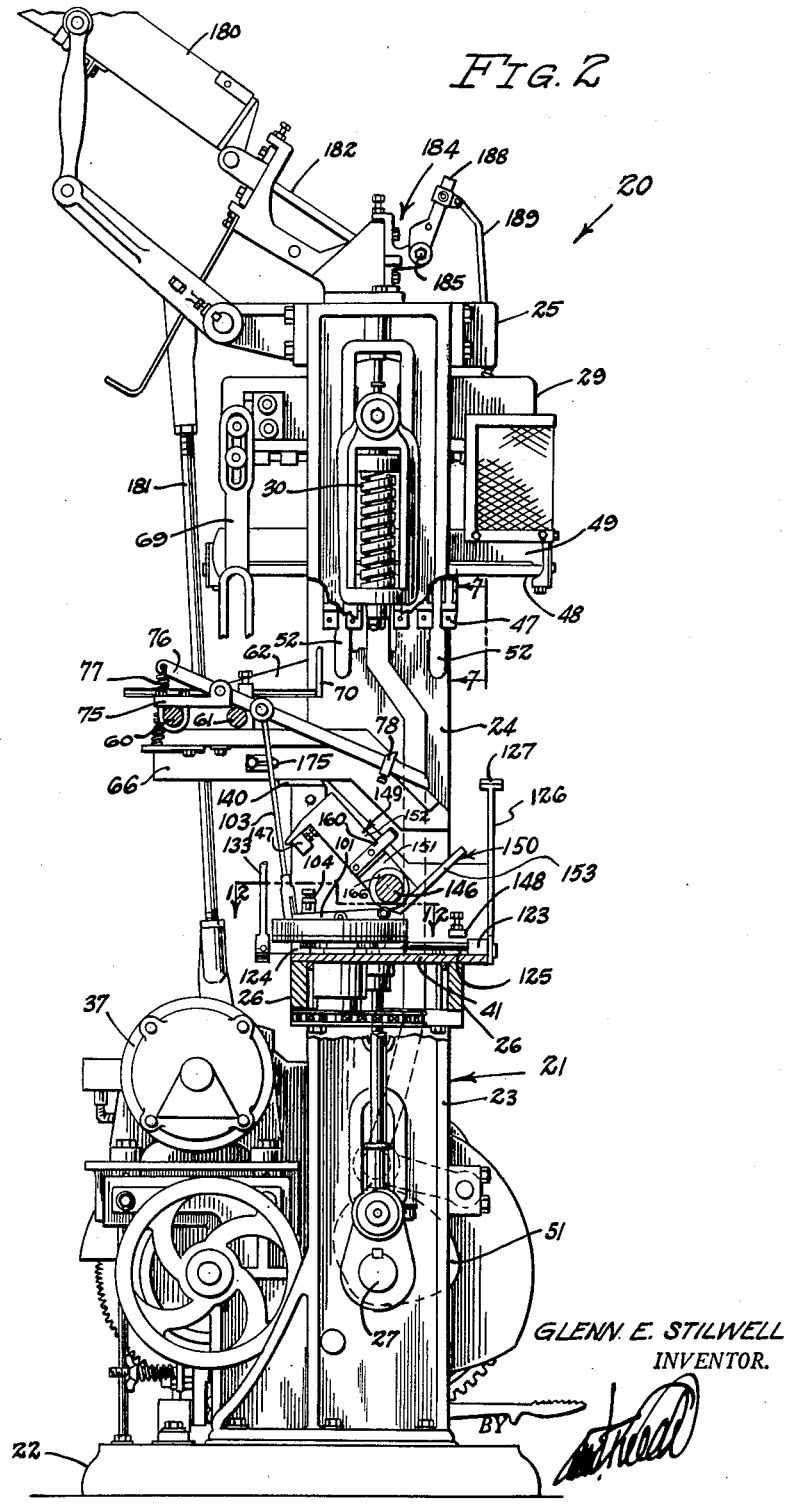

Feb. 23, 1954 — G. E. STILWELL — 2,669,715
MACHINE FOR MAKING HEXAGONAL BOXES
Filed July 27, 1949 — 5 Sheets-Sheet 3
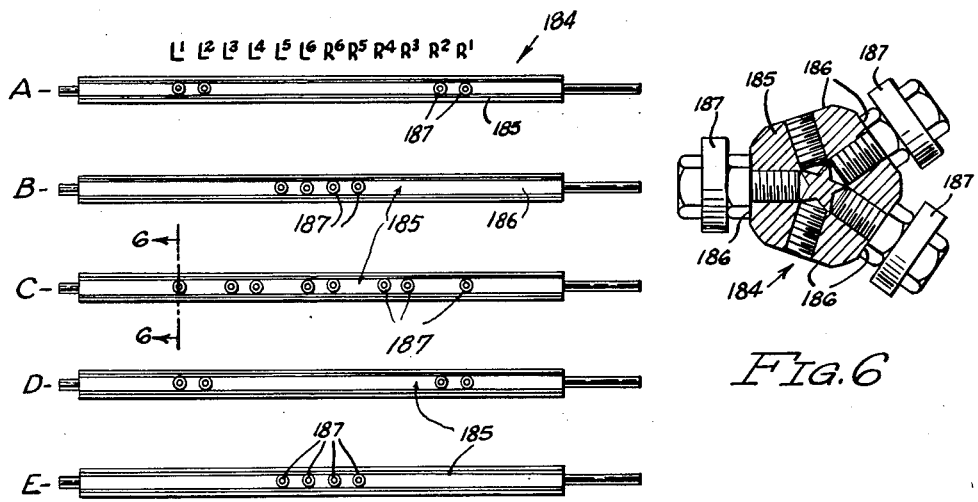
Fig. 5
Fig. 6
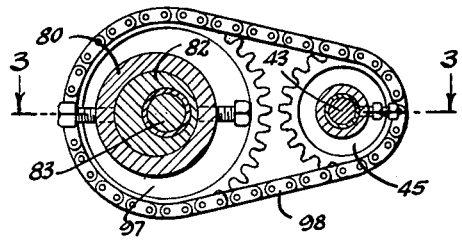
Fig. 4
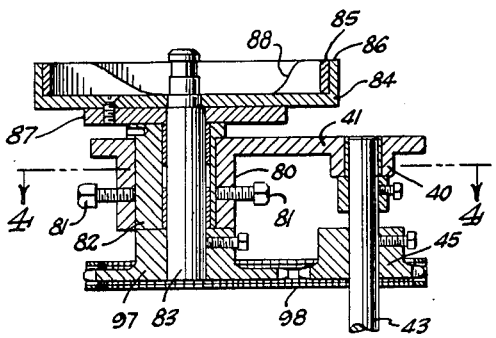
Fig. 3
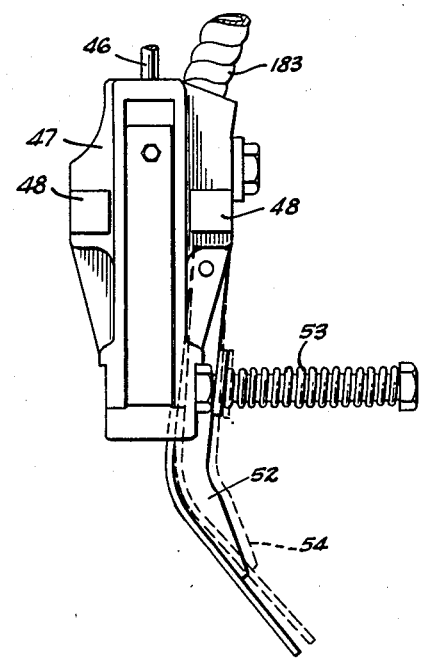
Fig. 7
GLENN E. STILWELL, INVENTOR.
BY
ATTORNEY Feb. 23, 1954 G. E. STILWELL 2,669,715
MACHINE FOR MAKING HEXAGONAL BOXES
Filed July 27, 1949 5 Sheets-Sheet 4

GLENN E. STILWELL
INVENTOR.

BY

ATTORNEY

Feb. 23, 1954 G. E. STILWELL 2,669,715
MACHINE FOR MAKING HEXAGONAL BOXES
Filed July 27, 1949 5 Sheets-Sheet 5
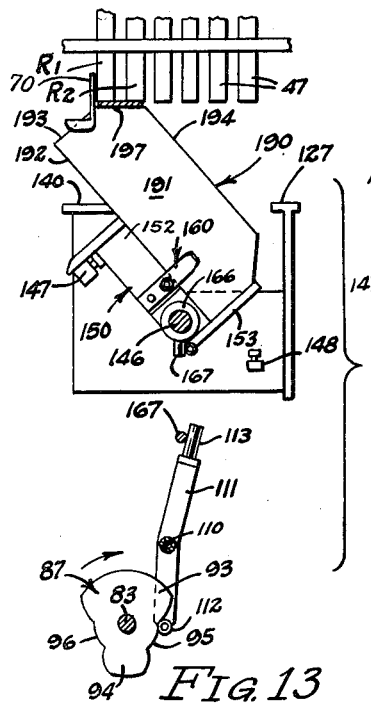
FIG.13
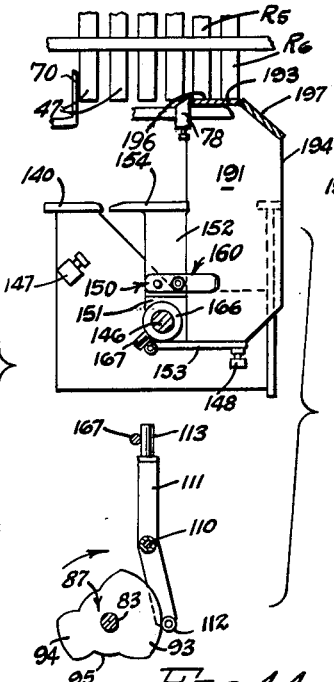
FIG.14
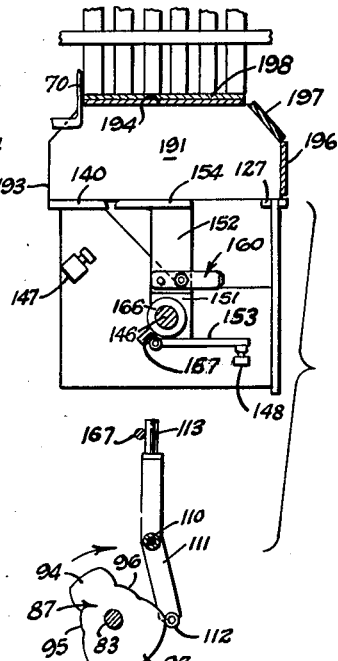
FIG.15
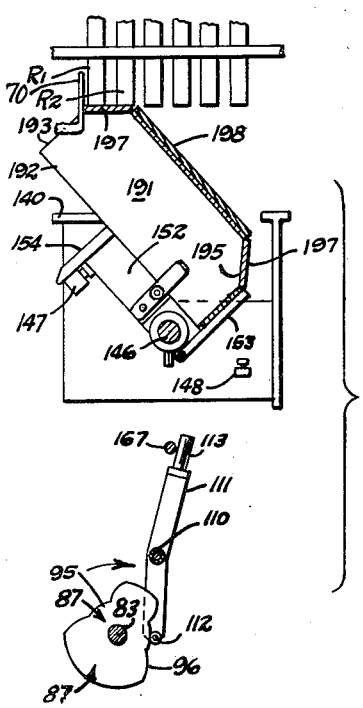
FIG.16
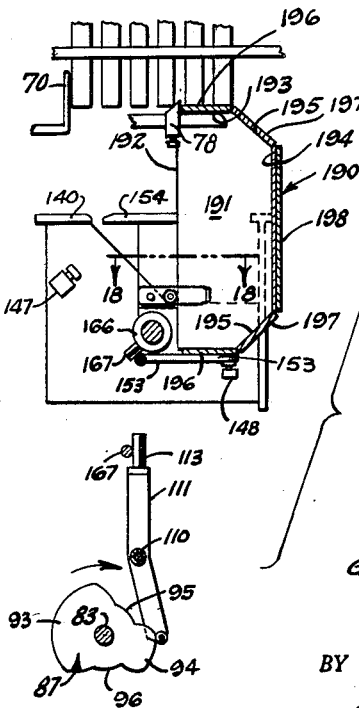
FIG.17
FIG.18
GLENN E. STILWELL
INVENTOR.
BY
ATTORNEY Patented Feb. 23, 1954

2,669,715

UNITED STATES PATENT OFFICE 2,669,715

MACHINE FOR MAKING HEXAGONAL BOXES

Glenn E. Stilwell, Riverside, Calif., assignor to Food Machinery and Chemical Corporation, San Jose, Calif., a corporation of Delaware Application July 27, 1949, Serial No. 107,089

20 Claims. (Cl. 1—10)

This invention relates to the box making art and is particularly useful in the manufacturing of wooden boxes having irregular shapes.

It is an object of this invention to produce a machine which may be used in the manufacture of a hexagonal box.

It is another object to provide such a machine in which a box may be produced having the side and bottom pieces disposed in more than three different planes.

A further object of the invention is to provide such a machine in which boxes may be manufactured having the side and bottom pieces thereof disposed in five different planes.

It is yet another object of the invention to provide a nailing machine in which a hexagonal box may be produced semi-automatically.

It is a still further object of this invention to produce a novel anvil for supporting box heads in the manufacture of a box.

The manner of accomplishing the foregoing objects as well as further objects and advantages will be made manifest in the following description taken in connection with the accompanying drawings in which:

Fig. 2 is a side elevational view of Fig. 1 with a middle portion of said nailing machine broken away and shown in section on line 2—2 of Fig. 1.

Fig. 3 is an enlarged vertical sectional view taken on the line 3—3 of Fig. 4.

Fig. 4 is a sectional view taken on line 4—4 of Fig. 3.

Fig. 5 is a composite view of five different positions of the hexagonal nail picker rotor of the invention.

Fig. 6 is an enlarged sectional view taken on the line 6—6 of Fig. 5.

Fig. 7 is an enlarged detail vertical sectional view taken on the line 7—7 of Fig. 2 and illustrating the construction of a shook flusher.

Figure 1:
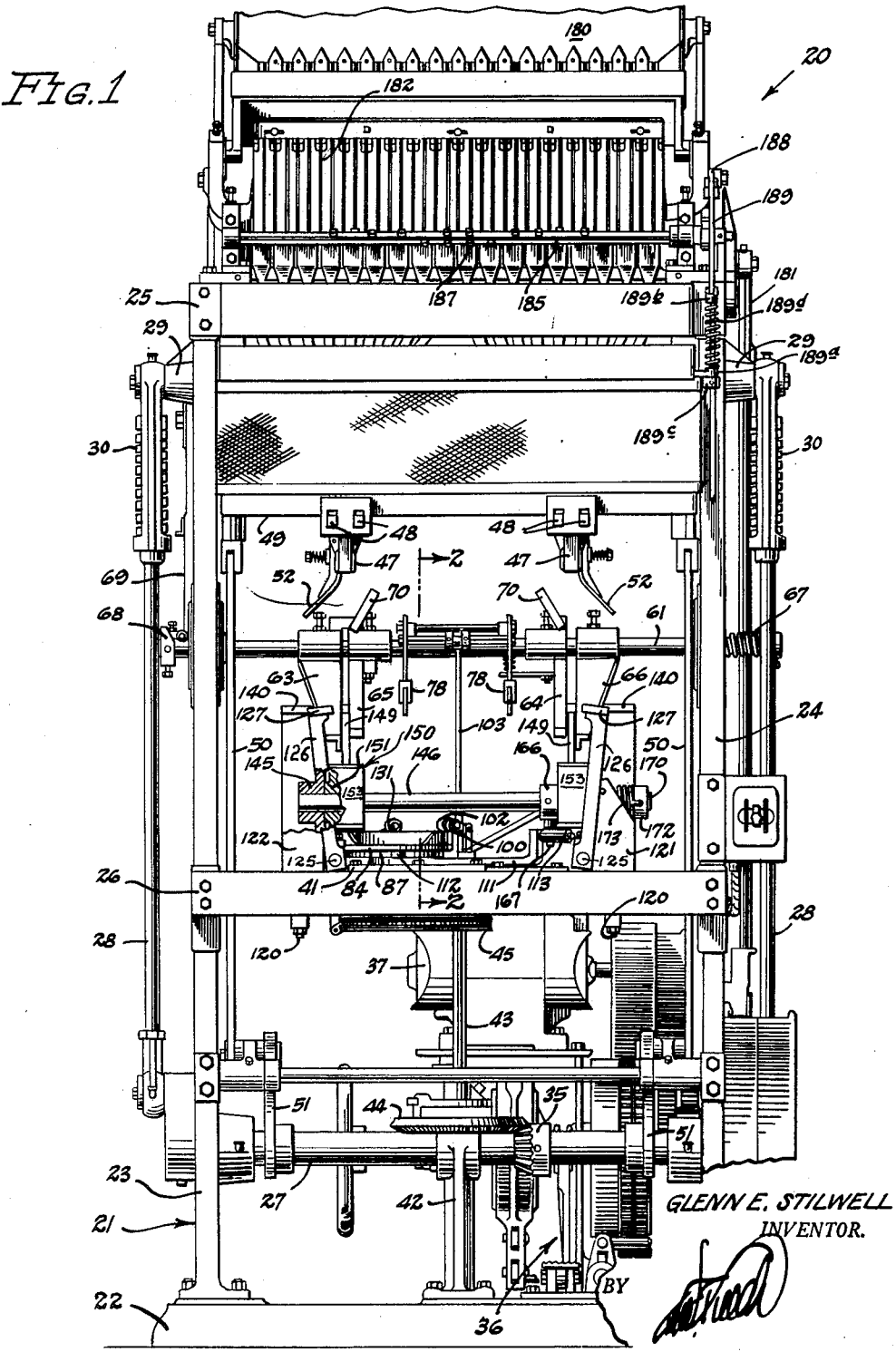
Fig. 1 is a front elevational view of a preferred embodiment of the present invention incorporated in a semi-automatic nailing machine.

Fig. 13 is a diagrammatic composite view illustrating the position of the work supporting anvil and the cam for actuating the same in the first phase of a box making cycle. The upper portion of this view lies in a vertical plane. The lower portion lies in a horizontal plane.

Fig. 14 is a view similar to Fig. 13 illustrating the second phase in said cycle.

Fig. 15 is a view similar to Fig. 14 illustrating the third phase in said cycle.

Fig. 16 is a view similar to Fig. 15 and illustrates the fourth phase in said cycle.

Fig. 17 is a view similar to Fig. 16 and illustrates the fifth and final phase in said box making cycle of operation.

Fig. 18 is an enlarged detail view of a box head flusher and gripper of the invention and is taken on line 18—18 of Fig. 17.

Referring specifically to the drawings the invention is there shown as incorporated in a nailing machine 20. This is one of the well-known semi-automatic "AC" box making machines manufactured by Food Machinery & Chemical Corporation at Riverside, California.

The machine 20 includes a frame 21 having a base 22 side standards 23 and 24, and cross bars 25 and 26 connecting said standards. Journaled in suitable bearings on the standards 24 is crank shaft 27 which is connected by pitmen 28 with a nail driving head 29. The pitmen 28 are provided with springs 30 which compensate for slight differences in thickness of the work into which the nails are driven.

The shaft 27 has a bevelled pinion 35 and is connected by a pedal-actuated transmission 36 to a motor 37 so that said transmission causes the shaft 27 to be given a single revolution each time the transmission is pedal-actuated.

Journaled at its upper end in a bearing 40 (Figs. 1, 3 and 4) provided on a plate 41 mounted on cross bars 26, and at its lower ends in a bearing provided on a post 42 mounted on the base 22 is a cam driver shaft 43 having a bevelled gear 44 fixed on its lower end which meshes with the bevelled pinion 35. Fixed on an upper portion of the shaft 43 is a sprocket 45.

The drive head 29 is provided with nail drivers 46 (Fig. 7) which are slideably related with nail chucks 47 carried on cross bars 48 mounted on a chuck supporting cross head 49. The cross head 49 is reciprocated vertically in timed relation with the nail drivers 46 through pitmen 50 by cams 51 fixed on the shaft 27. Nails are thus driven from the lower ends of chucks 47, when the lower faces of the latter arrives at a given horizontal plane, during each of five phases of a box making cycle. One of these phases takes place during each complete revolution of the shaft 27.

Pivotally mounted on certain of the chucks 47 are flushers 52 which are spring biased inwardly under pressure of coil springs 53 so that these flushers may yield outwardly as indicated by broken lines 54 in Fig. 7.

The nailing machine 20 has the usual pair of clamp shafts 60 and 61 mounted on brackets 62 extending rearwardly from standards 23 and 24 for supporting fixed clamps 63 and 64 and for supporting and shifting shiftable clamps 65 and 66. This is accomplished by rigidly fixing the shaft 60 on the brackets 62 and slidably mounting the shaft 61 thereon. A spring 67 on one end of the shaft 61 holds the clamp jaws 65 and 66 in normally expanded relation with the jaws 63 and 64 while a cam follower 68 on the opposite end of shaft 61 is engaged by a dagger cam 69 mounted on the driver head 29, when the latter descends at the initiation of a nailing operation, to clamp the work between the clamp jaws 63, 64, 65, and 66. At the conclusion of the nailing operation the cam 69 rises out of contact with the follower 68 permitting the spring 67 to free the work from said clamping action.

Figure 9:
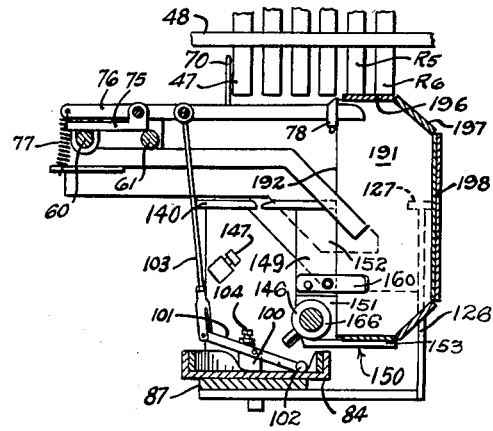
Fig. 9 is a view similar to Fig. 8 and illustrating how the slat stops of the invention are elevated into the operative position in a subsequent phase of a box-making cycle.

Mounted on the clamping jaws 64 and 65 are stops 70 which are adjustable to and from the work and which are provided for properly locating the oblique slats in the assembly of a box in the machine 20. Pivotally mounted on a bracket 75 which is fixed on shaft 60 is a double armed stop lever 76 which is spring biased by a spring 77 into horizontal position as shown in Fig. 9. This lever carries stops 78 and is cam controlled in a manner to be pointed out hereinafter.

Referring now to the plate 41 described hereinabove as secured to the cross bars 26, this plate has a bearing 80 provided with set screws 81 the latter fixing within said bearing an eccentric bearing sleeve 82 in which a vertical shaft 83 journals. Fixed on the upper end of said shaft is a cam disc 84 having ring cams 85 and 86 extending upward from the periphery thereof and a flat cam 87 mounted on the bottom thereof. The cam 85 is uniform in height excepting for a single dwell or recess 88 formed therein. Cam 86 has two high portions 89 and 90 which are uniformly of the same height of the high portion of the cam 85. Portion 89 occupies one-fifth of the circumference of cam 86, and portion 90 two-fifths thereof. These high portions are separated by dwell 91 and dwell 92 which are of equal length.

Cam 87, as shown in Figs. 13 to 16 inclusive has high portions 93 and 94 and dwells 95 and 96. Fixed on the lower end of shaft 83 is a sprocket 97 which lies in the same plane as and is connected to sprocket 45 by a chain 98 trained thereabout.

Figure 8:
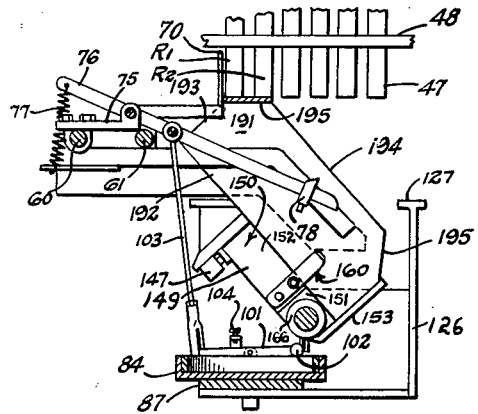
Fig. 8 is a diagrammatic fragmentary vertical cross sectional view illustrating how the slat stops of the invention are depressed during the first phase of a box-making cycle.

Pivotally supported on a bracket 100 (Figs. 1, 8, 9 and 12) which is fixed on the plate 41 is a cam lever 101 having a cam following roller 102 on one end thereof which rides on the cam 86 and the opposite end of which is connected by a link 103 with the stop lever 76. Provided in an overhanging portion of the bracket 100 is an adjustable stop screw 104 (Fig. 8) which limits the upward swinging of the stop lever 76 by the spring 77 which takes place whenever the roller 102 rides off one of the high portions 89 or 90 of the cam 86 into one of the dwells 91 or 92 thereof.

Pivoted on the plate 41 on a pin 110 (Fig. 13) is a cam responsive lever 111 having a cam following roller 112 which rides against the periphery of cam 87. Provided on the opposite end of the lever 111 is a roller 113. Supported on the cross bars 26 and secured thereto by bolts 120 are anvil bases 121 and 122 which are reverse duplicates of each other so that a description of one will suffice for both, and the same reference numerals will be used to apply to the details of both.

Provided on inner faces of these anvil bases are bearings 123 and 124 in which shafts 125 journal (Fig. 2). Fixed on the front ends of these shafts are auxiliary anvil support bars 126 having auxiliary anvils 127 welded on their upper ends. Fixed on the rear end of one of the shafts 125 is a crank 130 on one arm of which is provided a cam follower roller 131 which rides upon the cam 85 (see Figs. 10, 11, and 12). The other arm of crank 130 is connected by a link 132 to an arm 133 which is fixed on the rear end of the other shaft 125. The bell crank 130 is spring biased under the tension of the spring 134 so as to hold the roller 131 against the cam 85. This spring thus swings auxiliary anvils 127 inwardly into operative positions when the roller 131 rides off of the high portion of cam 85 into the dwell 88 thereof.

Each of the anvil bases 121 and 122 has a fixed anvil 140 (Figs. 1, 2, and 13) which extends inwardly through the space separating the clamping jaws 63 and 65 on the left side and 64 and 66 on the right side. Auxiliary anvils 127, when swung inwardly opposite the spaces between these clamping jaws, lie in the same horizontal plane as the anvils 140.

Also provided on the anvil bases 121 and 122 are bearings 145 in which a heavy shaft 146 journals. Extending inwardly from the bases 121 and 122 are adjustable stops 147 and 148 (Fig. 13).

Fixed on and rigidly united by the shaft 146 is a pair of rockable anvils 149 which together form an anvil cradle 150. Each of these anvils 149 has a heavy hub 151 to which is welded a plate member 152 which lies in a plane perpendicular to the shaft 146 and a plate member 153 which lies in a plane parallel with the shaft 146.

When the shaft 146 is turned to bring the member 153 against the stop 148 (see Figs. 14, 15, and 17) this member is horizontal and the member 152 is vertical and an upper edge of the latter forms an anvil 154 which lies in the same horizontal plane as the upper surfaces of the anvils 140. It is also to be noted that the member 152 and hub 151 of each rockable anvil 149 unite to form a square with the anvil member 153. Each plate member 152 is provided with a shook flusher and gripper 160 which includes a pair of shook guides 161 made of flat strap material lying close against the plate member 152 these guides being held in place at their rear ends by pins 162 and being spring biased against the plate 152 by springs 164 mounted on a bolt 165 which also extends through both of the guides 161 and the member 152 (Fig. 18).

Fixed on the shaft 146 adjacent to one of the rockable anvils 149 is a collar 166 on which a roller 167 is rotatably mounted so as to extend downwardly from said collar, as shown in Figs. 13 and 14, and in contact with the roller 113 whereby shifting of the latter by the cam 87 automatically determines the rotational position of the shaft 146.

Mounted on an end portion 170 of the shaft 146 which extends outwardly beyond the adjacent bearing 145, is a collar 172 and a coil spring 173 opposite ends of which are attached to said bearing and said collar so as to spring bias the shaft 146 to rock this and the rockable anvils 149 to bring the latter into rearwardly reclining positions as shown in Fig. 13 in which the plate members 152 engage the adjustable stops 147.

Adjustably secured to the inner face of clamp jaws 66 and 63 are box head stops 175 (Fig. 2).

The machine 20 is equipped with a nail feed pan 180 which is reciprocated in the well known manner by a pitman 181 so as to supply nails to a bank of nail runs 182 there being one of these nail runs for each of the nail chucks 47. The delivery of nails from the runs 182 to tubes 183 through which said nails gravitate through the chucks 47 is controlled by a nail picker mechanism 184 which is selective in character and operation similarly to the disclosure in U. S. Letters Patent to Twomley, No. 1,409,801, issued March 14, 1922.

The selective mechanism 184 differs from that in said patent in that the latter selectively controls the delivery of nails to the chucks through a series of four nailing operations comprising four successive phases of a box making cycle, whereas the mechanism 184 similarly controls the delivery of nails for a cycle comprising a series of five nailing operations. This difference is effected by mechanism 184 having a pentagonal nail picker rotor 185 each of the faces 186 of which is provided with a series of nail selecting rollers 187. The rollers 187 on each of these faces are disposed opposite those nail runs 182 of the chucks 47 from which it is desired to drive nails in a particular one of a series of phases involved in a box nailing cycle. When this particular face 186 of the rotor 185 is turned past individual nail pickers (not shown) located at the lower ends of nail runs 182 (and which are similar to the pickers shown in the aforesaid Twomley patent) the rollers 187 mounted on this face actuate the pickers disposed opposite these thereby causing nails to be delivered to the particular group of chucks 47 aforementioned.

Fig. 5 shows the rotor 185 in five different positions in each of which a different one of the faces 186 thereof is turned toward the observer.

Directly above the uppermost illustration in Fig. 5 of the rotor 185, reference numbers L-1 to L-6 and R-6 to R-1 are placed to identify the locations of the rollers 187 on the rotor 185 which causes nails to be delivered respectively to the six chucks 47 on the left side of the machine and to the six chucks 47 on the right side of the machine. Proceeding downwardly from the top of Fig. 5, the rollers 187 are operative to deliver nails to the chucks in machine 20 each of the series of five nailing operations which take place in the making of a box therein are successively presented to view. For convenience these five positions of the rotor 185 shown in Fig. 5 are indicated by the letters A to E inclusive.

The rotor 185 is rotated during each vertical reciprocation of the nail driving head 29 to advance the rotor one-fifth of a revolution and thus deliver nails to those chucks 47 from which nails must be driven during the next succeeding nailing operation. This rotation of rotor 185 is effected by a ratchet arm 188 mounted thereon and a link 189 pivoted on this arm and extending through an eye 189a on the nail driving head 29 (Figs. 1 and 2). Collars 189b and 189c and a spring 189d on this link causing it to respond positively on the downstroke and yieldably on the upstroke of the head 29.

*Operation*

The specific embodiment of the invention incorporated in the nailing machine 20 and disclosed herein is designed for the purpose of manufacturing a lug box 190 which comprises two heads 191 each of which has a top edge face 192, side edge faces 193, a bottom edge face 194, and oblique edge faces 195, the latter being disposed between and joining the edge faces 193 and 194. A box is formed by nailing slats 196 to the side faces 193; slats 197 to oblique face 195 and a bottom 198 to the bottom face 194. This is accomplished in the machine 20 by a series of five operations in each of which one of said slats or said bottom is nailed to the box heads 191. These five operations are illustrated diagrammatically in Figs. 13 to 17 inclusive.

It is to be understood that machine 20 is of the type known as a semi-automatic nailing machine in which the burden of feeding the shook or box parts in the machine is left to the operator. Certain necessary shifting of the work while making a box with machine 20 is also left to the operator.

At the beginning of a box making cycle the parts of the machine are positioned as shown in Figs. 1, 2, 8, 10, and 13. The first thing done by the operator is to insert a pair of heads 191 into the slots between clamp jaws 63 and 65, 64 and 66, with these heads resting in reclining positions on the rockable anvil cradle 150 as shown in Fig. 13. The operator now places a slat 197 into the position in which it is shown in Fig. 13 with the back edge of the slat engaging the stops 70.

The operator now tromps on the clutch pedal to cause a single revolution of the shaft 27. This moves the chucks 47 down onto the work (Fig. 13) with chucks L-1 and L-2 resting on the left end of said slat 197 and chucks R-2 and R-1 resting on the right end of said slat. As shown in Fig. 5 four rollers 187 on the nail picker rotor 185 have caused nails to be fed to the aforesaid chucks resting on this slat 197 prior to the actuation of the machine so that with said actuation, nails are driven from these chucks through said slat and into the box heads 191.

The shaft 83 being given one-fifth of a revolution during the nailing operation just described, this turns the cam 87 to force the roller 113 against the roller 167 thereby rocking the anvil cradle 150 into upright position as shown in Fig. 14. Fig. 5B shows how the first nailing operation has caused nails to be delivered to chucks L-5 and L-6, R-5 and R-6 which are now disposed directly over the upwardly disposed side edge faces 193 of the heads 191. The first nailing operation has also rotated the cam 86 to bring the dwell 92 beneath the roller 102 thus releasing the slat stop levers 76 permitting the spring 77 to swing these into horizontal position as shown in Fig. 9 whereby stops 78 thereon are located to indicate the proper position of the rear edge of a slat 196 to be nailed onto the upwardly disposed side edge faces 193 of the heads 191.

The operator now inserts such a slat 196 into place resting on the upwardly disposed faces 193 against the stops 78 and depresses the pedal of the power mechanism 36 causing a second nailing operation to take place.

The operator now seizes the work by the slats 196 and 197 first nailed thereto and reverses the work so as to switch the heads about and leave the slats 197 and 196 already nailed onto the heads facing the operator and with the top edges 192 of such heads resting downward on anvils 149, 154, and 127.

As shown in Fig. 5C, the nail picking mechanism 184 was actuated in the second nailing operation to deliver nails to chucks L-1, L-3, L-4 and L-6, and R-1, R-3, R-4 and R-6. Thus the proper chucks are now charged with nails for the third nailing operation which follows and in which a bottom 198 is to be nailed on the bottom edge faces 194 of the box heads 191.

Figure 10:
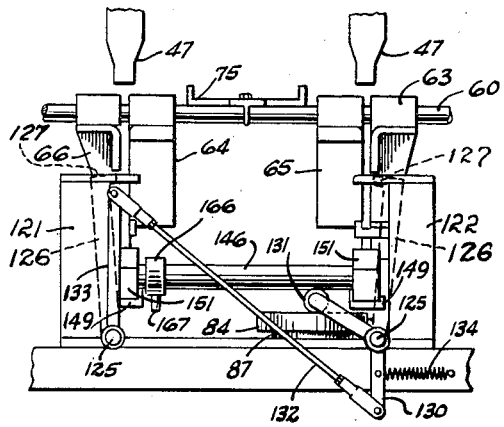
Fig. 10 is a fragmentary diagrammatic rear elevational view of the auxiliary anvil operating elements of the invention with said anvils outwardly retracted as shown in Fig. 1.
Figure 11:
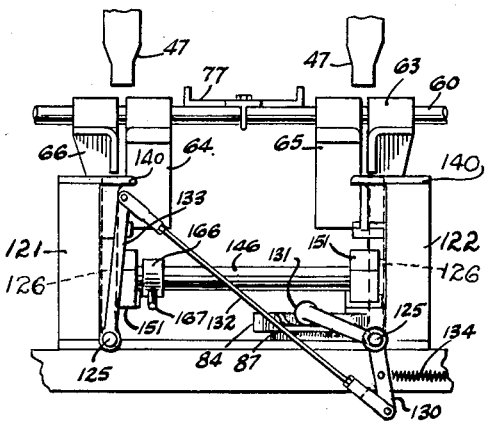
Fig. 11 is a view similar to Fig. 10 and shows said operating elements positioned as when said auxiliary anvils are swung inwardly into operative positions.
Figure 12:
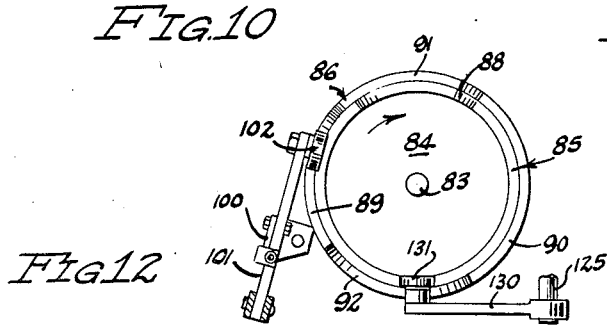
Fig. 12 is a fragmentary plan view of the operating cams for the auxiliary anvils and oblique slat stops of the invention, and is taken on line 12—12 of Fig. 2.

In the second nailing operation above described and shown in Fig. 14, the roller 112 remained on the high face 93 of the cam 87 as shown in Fig. 15 so that the rockable anvil cradle 150 is still disposed upright as it appears in this view. The cam roller 102 however rode onto high portion 90 of the cam 86 (see Fig. 3) so as to depress the slat stops 78. As shown in Fig. 10, the cam roller 131, in the second nailing operation, dropped into the single dwell 88 of this cam thereby rotating the shafts 125 and swinging the anvils 127 inwardly into alignment with the anvils 149 and 154 as shown in Figs. 11 and 15.

The stops 70 being also permanently positioned to indicate the proper location of the back edge of a box bottom 198 when this is being nailed onto the heads 191, such a bottom is now inserted into the machine against said stops and the mechanism actuated to accomplish the third nailing operation in which the box bottom is nailed to the box heads.

The third nailing operation (taking place in Fig. 15) rotates the cam 87 to bring the roller 112 into the dwell 96, thereby permitting the shaft 146 to be rocked by the spring 173 causing the anvil cradle 150 to recline rearwardly with the plate members 152 thereof resting on the stops 147 as shown in Fig. 16. At this time the roller 131 rides up out of the dwell onto the high portion of the cam 85 thus swinging the anvils 127 laterally out of the way as shown in Figs. 1 and 10.

The operator now repositions the work as shown in Fig. 16 and inserts another slat 197 onto the upturned oblique edge faces 193 of the heads 191 with the rear edges of this slat against the stops 78. The operator then actuates the power transmission 36 to cause nails to be driven from chucks R-1, R-2, L-1, and L-2, which rest on this slat, thereby nailing the latter to the heads.

The fourth nailing operation, just described, ends by rocking the anvil cradle 150 into upright position as shown in Fig. 17 and permitting cam roller 102 to drop into dwell 91, thereby again raising the slat stops 78 into operative positions. The operator thereupon inserts the second side slat 196 so this will rest on the upwardly disposed side edge faces 193 of the heads 191 and against the slat stops 78.

He then actuates the power transmission 36 to cause the final nailing operation in the manufacture of box 190, and in which the second side slat 196 is nailed to the box heads.

It will be noted that the uppermost horizontal level of the work at which nails are driven from chucks 47 varies in that the heads 191 are supported somewhat higher when nailing the second oblique slat 197 onto the heads or the second side slat 196 onto said heads (see Figs. 16 and 17) than when the initial oblique and side slats were nailed thereon (see Figs. 13 and 14). This difference results from the heads being spaced from the anvils 153 in Figs. 16 and 17 by the initial slat 196 which had been nailed to the heads in the side slat nailing operation shown in Fig. 14. This means that the chucks 47 from which nails are driven in the fourth nailing operations are not permitted to descend to quite as low a level in driving the nails into the work as they were in the first, second, and third nailing operations. The compensating springs 30 are depended upon to compensate for this difference in height of the nailing level to which the chucks and drivers are permitted to descend.

In each of the nailing operations above described the flushers 52, descending with the nailing chucks 47, center the slats and bottom pieces flush with the outer faces of the box heads 191 just prior to nails being driven from the chucks to nail these pieces onto the box heads.

It should also be noted that cam 69 functions in the initial portion of each nailing stroke of the machine 20 to shift clamp jaws 65 and 66 toward the clamp jaws 63 and 64 to clamp these heads in the precise positions they should be in when the slats and bottom are nailed thereto to make a box of proper length and with the heads parallel.

The claims are:

1. In an apparatus for use in the manufacture of a box having two heads each of which has two pairs of opposite parallel edge faces both edge faces of each pair being rectangularly related to both edge faces of the other pair, each head also having an edge face which is obliquely related to the other edge faces, the combination of: an anvil cradle for supporting said heads in proper parallel spaced relation for making said box; means for pivotally mounting said cradle for a rocking movement on a horizontal axis between a primary position in which said pairs of rectangularly related edge faces are inclined from horizontal while said oblique faces are disposed upwardly in a given horizontal plane, and a secondary position in which said pairs of rectangularly related edge faces are horizontally and vertically disposed, with the upper of said horizontally disposed edge faces lying in said given horizontal plane; and stop means between which said cradle is adapted to be rocked to readily move said cradle from one of said positions to the other of said positions.

2. A combination as in claim 1 in which the rocking axis of said cradle is positioned relative to the heads supported on said anvil whereby said heads are supported with said cradle in its secondary position with certain of said rectangularly related edge faces disposed upwardly and in substantially the same horizontal plane as said oblique edge faces are disposed when said cradle is in its primary position aforesaid; and nailing mechanism including banks of nail chucks and drivers, actuation of which with said cradle in its primary position, drives nails downwardly through slats resting on said oblique head faces from certain of said chucks and, with said cradle in its secondary position, drives nails downwardly through slats resting on said upwardly disposed horizontal head faces from certain other of said chucks.

3. A combination as in claim 2 including means responsive to successive actuations of said nailing mechanism to rock said cradle between said primary and secondary positions to properly present said heads for the nailing of a series of slats thereto.

4. In an apparatus for use in manufacturing boxes the combination of: an anvil cradle having anvil faces disposed to engage and support adjacent edge faces of a box head placed thereon; means for pivoting said anvil cradle for rocking on an axis at right angles to the plane of a head resting on said anvil cradle; and stop means for limiting the rocking of said anvil cradle between primary and secondary box-head-supporting positions, in each of which a different one of the edge faces of said head is presented upwardly in a horizontal plane for the nailing of a slat thereto, said axis being so located in relation to the primary and secondary positions of said anvil cradle and the location on said cradle of said edge faces that the edge faces presented upwardly, with said cradle in said two positions, lie in substantially the same horizontal plane.

5. A combination as in claim 4 in which a clamp including a pair of jaws is provided for rigidly positioning said box head during a nailing operation with said anvil cradle in each of said two positions, a portion of said anvil cradle swinging between said jaws during the rocking of said cradle between said two positions.

6. In an apparatus for use in the manufacture of a box the heads of which have three corresponding pairs of edge faces, each pair of said faces having opposite ends of a slat nailed thereto, the first and third of said pairs of edges being at right angles to each other in the planes of said heads while the second of said pairs lies between and is obliquely related to the first and third of said pairs, the combination of: an anvil cradle formed to support a pair of heads for such a box by simultaneous engagement with faces parallel with and diametrically opposite to said first and third pairs of faces; means for pivotally mounting said cradle for rocking movement in the planes of said heads; and stop means limiting the rocking of said cradle to movement between a primary position in which said second pair of head edge faces is presented horizontally upwardly for the nailing of a slat thereon, and a secondary position in which said first pair of head edge faces is presented horizontally upwardly for the nailing of a slat thereon.

7. A combination as in claim 6 including a nailing mechanism having banks of nailing chucks and drivers operating in the planes of said heads to drive nails downwardly into work at a given nailing level, the upper faces of the slats applied to said horizontal second and first pairs of head edge faces, when said cradle is in its primary and secondary positions respectively, being at said level, the slat applied at said level to said second pair of faces underlying a certain group of said nailing chucks and receiving nails only from said group, the slat applied at said level to said first pair of faces underlying a different group of said nailing chucks and receiving nails only from said different group; and means for rocking said cradle from one of said positions to the other and coordinately therewith feeding nails to that group of chucks from which nails are exclusively required to be driven for attaching the slat to be secured to said heads with the cradle in said other position.

8. A combination as in claim 7 in which said cradle, while in its secondary position aforesaid, also provides means affording optional support for said heads in the planes thereof and presenting said third pair of head edge faces horizontally upwardly with a slat laid thereon at said nailing level and underlying a still different group of said chucks, said cradle rocking and nail feeding means being actuated by successive nailing operations of said nailing mechanism, said means being so actuated, by the nailing of a slat onto said first pair of head edge faces to retain said cradle in its secondary position and feed nails to the group of chucks overlying the slat applied to said third pair of head edge faces and disposed at the nailing level aforesaid.

9. A combination as in claim 6 in which said cradle, in its secondary position aforesaid, also provides means affording optional support for said heads in the planes thereof, which heads, when so supported, present said third pair of head edge faces horizontally upwardly for the securing of a slat thereto.

10. A combination as in claim 6 in which said cradle in its secondary position aforesaid also provides means affording optional support for said heads in the planes thereof, which heads, when so supported, present said third pair of head edge faces horizontally upwardly for the securing of a slat thereto; and auxiliary horizontal support means disposed on the same level as the aforesaid optional support means on said cradle and in opposite directions therefrom to assist in supporting said heads with said third pair of head edge faces presented horizontally upwardly.

11. A combination as in claim 6 in which said cradle in its secondary position aforesaid also provides means affording optional support for said heads in the planes thereof, which heads, when so supported, present said third pair of head edge faces horizontally upwardly for the securing of a slat thereto; and auxiliary horizontal support means disposed on the same level as the aforesaid optional support means on said cradle and in opposite directions therefrom to assist in supporting said heads with said third pair of head edge faces presented horizontally upwardly, said auxiliary support means including a fixed horizontal support and a shiftable horizontal support, the latter when in use occupying space from which it must be shifted to accommodate said heads in said cradle when said cradle is in its secondary position and when said heads are supported therein with said first pair of head edge faces presented horizontally upwardly.

12. In an apparatus for use in the manufacture of a box having two heads each of which has a bottom edge face and an edge face which is obliquely related to said bottom edge face, the combination of: an anvil cradle for supporting said heads in proper parallel spaced relation for making said box; means for pivotally mounting said cradle on a horizontal axis for a rocking movement between a primary position in which said bottom edge faces are inclined from horizontal while said oblique faces are disposed upwardly in a given horizontal plane, and a secondary position; stop means between which said cradle is adapted to be rocked to move said cradle from one to the other of said positions;

and anvils provided on said anvil cradle which, when said cradle is in said secondary position, are disposed above said axis, whereby said anvils are adapted to support said heads to present said bottom edges thereof upwardly substantially in said horizontal plane.

13. A combination as in claim 12 in which fixed horizontal supports are provided which serve as extensions of the aforesaid anvils, when the latter are disposed above said axis, thereby aiding in the support of said box heads with said bottom edges of said box heads disposed substantially in said horizontal plane.

14. A combination as in claim 13 in which shiftable supports are provided which are adapted to be shifted into position substantially in line with said anvils when the latter are disposed above said axis, and operating as extensions of said anvils lying in the opposite direction therefrom as said fixed supports, to co-operate with said anvils and said fixed supports in supporting said heads.

15. A combination as in claim 12 including a nailing mechanism having banks of nailing chucks and drivers operating in the planes of said heads to drive nails downwardly into the work at a given nailing level, the upper face of a slat applied to said oblique head edges and the upper face of a bottom applied to said bottom edge faces, when said cradle is in its primary and secondary positions respectively, being at said level, the slat applied at said level to said oblique edge faces underlying a certain group of said nailing chucks and receiving nails from said group, the bottom applied at said level to said bottom edge faces underlying a different group of said nailing chucks and receiving nails from said different group; means for actuating said nailing mechanism through a series of nailing cycles; and means operating coordinately with said actuating means, between the mid-points of successive nailing cycles, for rocking said cradle from one to the other of said positions and feeding nails to that group of chucks from which nails are required to be driven in the latter of said successive cycles, with said cradle in said other position.

16. In an apparatus for use in the manufacture of a box having two heads each of which has first and second edge faces which are obliquely related to each other, the combination of: an anvil cradle supporting said heads in proper parallel spaced relation for making said box; means for pivotally mounting said cradle on a horizontal axis for a rocking movement between a primary position in which said first edge faces are inclined from horizontal while said second edge faces are disposed upwardly in a given horizontal plane, and a secondary position in which said second edge faces are inclined from horizontal and said first edge faces are disposed upwardly substantially in said horizontal plane; and stop means for halting said cradle in its respective positions aforesaid.

17. A combination as in claim 16 including a nailing mechanism having banks of nailing chucks and drivers operating in the planes of said heads to drive nails downwardly into the work at a given nailing level, the upper faces of slats applied respectively to said second and first head edge faces, when said cradle is in its primary and secondary positions respectively, being at said level, the slat applied at said level to said second edge faces underlying a certain group of said nailing chucks and receiving nails from said group, the slat applied at said level to said first edge faces underlying a different group of said nailing chucks and receiving nails from said different group; means for actuating said nailing mechanism through a series of nailing cycles; and means operating coordinately with said actuating means, between the mid-points of successive nailing cycles, for rocking said cradle from one to the other of said positions and feeding nails to that group of chucks from which nails are required to be driven in the latter of said successive cycles with said cradle in said other position.

18. In an apparatus for use in manufacturing boxes, the combination of: an anvil cradle having a pair of angled anvils the faces of which respectively engage adjacent edge faces of a pair of box heads to support the latter in proper parallel spaced relation for making a box, and means for coaxially uniting said anvils for simultaneous rotation on an axis at right angles to the planes of said heads; and stop means for limiting the rotation to rocking movements of said anvil cradle back and forth between primary and secondary box head supporting positions in each of which positions a different corresponding pair of the edge faces of said heads is presented upwardly in a horizontal plane for the nailing of a slat thereto.

19. A combination as in claim 18 in which said apparatus includes a nail driving mechanism mounted in spaced relation with and above said anvil cradle; means for causing relative vertical movement between said anvil cradle and said nailing mechanism to effect the nailing of slats to said upwardly presented pairs of head edge faces, there being one of such nailing cycles for the nailing of a slat on said heads while said anvil cradle is in each of its primary and secondary positions as aforesaid; and means operating in timed relation with the functioning of said nailing mechanism while said anvil cradle is in its primary position to shift said anvil cradle into its secondary position in preparation for the performance of the next subsequent nailing cycle.

20. A combination as in claim 19 in which said anvil cradle shifting means functions in timed relation with said nailing mechanism during a particular nailing cycle subsequent to said first-mentioned nailing cycle to reversely rock said anvil cradle from its secondary position to its primary position in preparation for the nailing cycle immediately following said last-mentioned shifting of said anvil cradle.

GLENN E. STILWELL.

References Cited in the file of this patent

UNITED STATES PATENTS

| Number | Name | Date |
| --- | --- | --- |
| 784,936 | Greenstreet | Mar. 14, 1905 |
| 1,978,613 | Twomley | Oct. 30, 1934 |
| 2,004,355 | Twomley | June 11, 1935 |